UNITED STATES PATENT OFFICE.

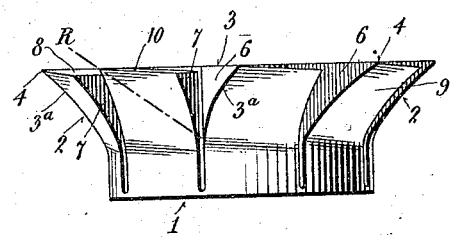
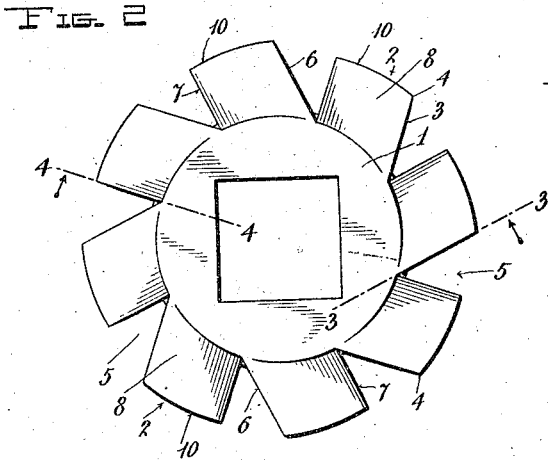
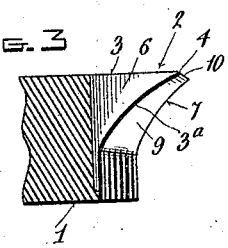
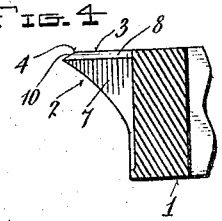
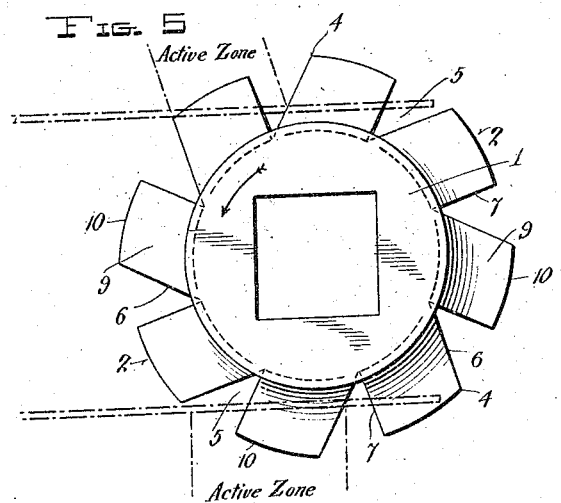

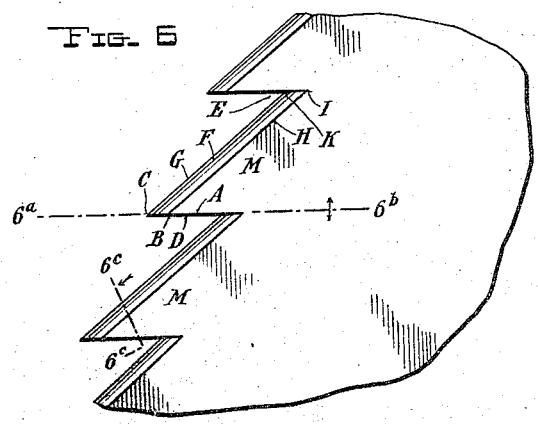
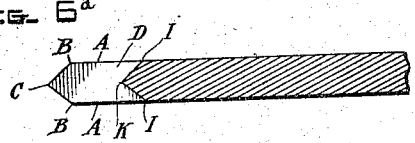 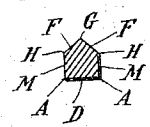
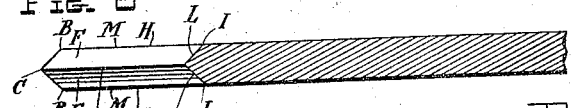
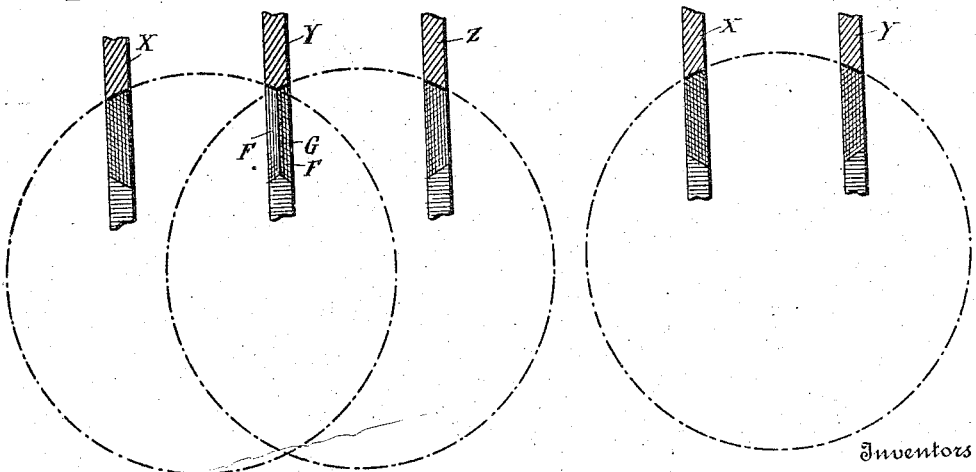

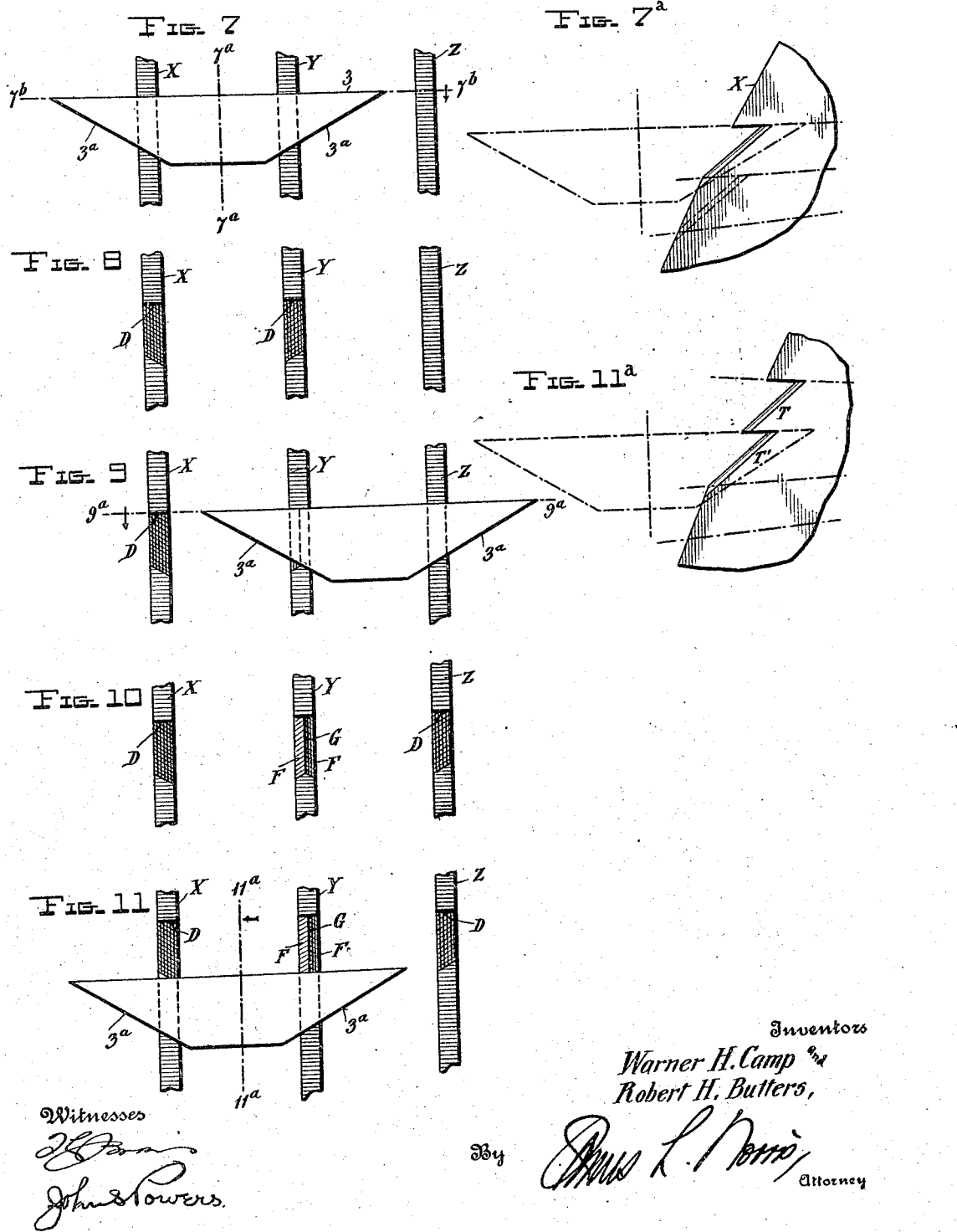

WARNER H. CAMP AND ROBERT H. BUTTERS, OF ATLANTA, GEORGIA, ASSIGNORS TO THE BUTTERS-CAMP MFG. CO., OF ATLANTA, GEORGIA, A CORPORATION OF GEORGIA.

ROTARY CUTTER FOR FORMING OR RENEWING GIN OR LINTER SAW TEETH.

1,419,917.  Specification of Letters Patent.  Patented June 20, 1922.

Application filed April 11, 1919. Serial No. 289,221.

*To all whom it may concern:*

Be it known that we, WARNER H. CAMP and ROBERT H. BUTTERS, citizens of the United States, residing at Atlanta, in the county of Fulton and State of Georgia, have invented new and useful Improvements in Rotary Cutters for Forming or Renewing Gin or Linter Saw Teeth, of which the following is a specification.

This invention relates to an improved rotary cutter for forming or renewing gin or linter saw teeth, proposing a cutter which is especially applicable to the production of teeth of the general type disclosed in the Letters Patent of R. H. Butters, No. 1,346,396, according to the method disclosed in the Letters Patent of R. H. Butters, No. 1,277,375, granted September 3, 1918, as practiced by the machine disclosed in the Letters Patent of R. H Butters, No. 1,329,036.

The objects of the invention are, first, to improve the form and augment the strength of the said tooth; second, to maintain the proportions of the said teeth in constant ratio to the diameter of the saw as such diameter may be reduced from maximum to minimum within the limits of serviceability; third, to enable a selection of the angle of the saw teeth, relatively to the saw circumference, whereby the said angle may be varied as desired without varying the cross sectional form of the cutter teeth or the outline of their respective cutting edges and without impairing the form of the saw teeth; and finally to provide a shearing action which substantially eliminates or prevents vibration or chattering.

With the above objects in view, the invention consists of a cutter of novel constructional form whose essential and distinctive features will be pointed out in detail as the description proceeds.

As regards the first object, the improved cutter produces a tooth whose back is straight or convex from throat to point, and whose point is short and, therefore, extremely sturdy.

As regards the second object, it may be assumed that a new saw has a diameter of 12.50" and is provided with 300 teeth, each of which subtends a maximum arc of 0.13". As the saw is repeatedly resharpened and renewed by means of the method and machine referred to it is reduced in diameter and such reduction of the diameter may be very considerable within the limits of serviceability. Thus, a saw may be reduced to a diameter of 10.50" more or less, without seriously impairing its efficiency although it is advisable to compensate for the reduction of diameter by an increase in the speed of rotation, i. e., if the speed of a saw when new be 600 R. P. M. the speed of the same saw when reduced to a diameter of 10.50" should be 800 R. P. M. As the saw is thus reduced in diameter the arc subtended by the teeth proportionately decreases, being approximately 0.11" for a saw of 10.50" diameter and provided with 300 cutting teeth.

The cutter is resharpened at regular intervals of greater or less frequency in accordance with the number of linters being cared for by the saw sharpening machine of which the cutter is an element. In such necessary resharpening of the cutter tooth its original cross-sectional outline is maintained and its reduction in maximum thickness may be readily caused to be proportionate to the above-explained reduction of the arc subtended by the teeth of the saw in which case the form of the saw teeth will be invariable for any diameter while the proportions of the teeth will be in constant ratio to the diameter of the saw as such diameter may be reduced by the repeated resharpening and renewal of the saw.

As regards the third object, the saw tooth, having its back along a straight or convex line, may have the angle of such line relative to the circumference varied by suitable selection of the curve of the lower cutting edge of the cutter teeth without, however, varying the cross-sectional form of the cutter teeth or varying the form of said lower cutting edge which constitutes a generatrix adapted to the above-explained improvement in the form of the saw teeth.

The last object involves a structural feature whose provision is a matter of choice and greatly benefits the operation of the cutter but has no relation to the form of the teeth; and which, while within the purview of the invention, is not to be regarded as a limitation thereof in its broader aspects. This feature consists in the arrangement of each cutting edge in a plane at a suitable angle to a radial plane of the cutter touching said edge at any point thereof whereby a sensible shearing action on the saw teeth is produced in the operation of said edge which is effective substantially to eliminate or prevent vibration or chattering.

A cutter constructed in accordance with the invention, and saw teeth produced thereby, are illustrated in the accompanying drawings, wherein:—

Figure 1 is a side elevation of the improved cutter;

Figure 2 is a plan view thereof;

Figures 3 and 4 are detail sectional views on the lines 3—3 and 4—4 of Figure 2;

Figure 5 is a diagram showing the cutter in bottom plan and in operative relation to a pair of saws, the arrow indicating the direction in which the cutter rotates and the active zones being so designated;

Figure 6 is a fragmentary side elevation of a saw showing the completely formed teeth;

Figure 6$^a$ is a bottom sectional plan view projected in the plane 6$^a$—6$^b$ of Figure 6;

Figure 6$^b$ is a normal plan view projected in the plane 6$^a$—6$^b$ of Figure 6;

Figure 6$^c$ is a cross-sectional view of one of the saw teeth in the plane 6$^c$—6$^c$ of Figure 6;

Figures 7—11$^a$ are views illustrating diagrammatically the method of forming the saw teeth;

Figure 7 is a diagrammatic front or edge elevation showing a cutter as working simultaneously upon two saws at relatively opposite sides thereof;

Figure 7$^a$ is a side elevation projected in the plane 7$^a$—7$^a$ of Figure 7;

Figure 7$^b$ is a sectional plan view projected in the plane 7$^b$—7$^b$ of Figure 7;

Figure 8 is a view similar to Figure 7 but with the cutter omitted and showing more particularly the condition of the saws upon the completion of the first or initial cut;

Figure 9 is a view similar to Figure 7 but showing the cutter as making the second or final cut on one of the saws;

Figure 9$^a$ is a sectional plan view projected in the plane 9$^a$—9$^a$ of Figure 9;

Figure 10 is a view showing the saws upon the completion of the operation depicted in Figures 9 and 9$^a$;

Figure 11 is a view similar to Figure 7 but showing the cutter working on the teeth next below those shown in Figure 8;

Figure 11$^a$ is a side elevation projected in the plane 11$^a$—11$^a$ of Figure 11.

In all of the figures, the saw teeth and the cutter have been drawn to a greatly exaggerated scale to promote clearness of illustration.

Similar characters of reference designate corresponding parts throughout the several views.

The improved cutter produces teeth of the character disclosed in the pending application of R. H. Butters, Serial No. 152.894, and for convenience such teeth are illustrated in Figures 6—6$^c$ and will be briefly described. The teeth shown are adapted for linter saws and, as finished, have cutting edges A which are preferably parallel as far as points B and from said points B taper to a terminal point C. The edges A and the points B and C are in the plane of the base or front D of the tooth; and the base D of one tooth meets the upper face of the tooth next below, forming therewith an angular throat E. The upper face or back of each tooth has sides F inclined divergingly and symmetrically from a central apex G. Inwardly of the inclined faces F the teeth have the same thickness as the saw and their sides M are co-planar with the sides of the saw. The side edges H of the inclined faces F extend parallel to the apex G and from the points B to points I in the rear of the point K whereat the apex G meets the base D of the tooth next above and between which and the terminal point C the apex G extends. The points I and K may be regarded as the angles of an imaginary triangle co-planar with the base D, the two sides L of which triangle connect the point K with the points I. The point K, sides L and points I constitute the angular base line of the throat E which thus has a convex V-form.

The advantages of saw teeth of the above construction are fully set forth in the said application of R. H. Butters, Serial No. 152.894, and need not be repeated in this specification. It may be pointed out, however, that teeth having the above structural characteristics are greatly improved, as regards strength and cutting and wearing efficiency, by making their backs, i. e., their apices G and inclined faces F either straight, as shown, or somewhat convex, from their throats E to their convexly V-shaped points, and such an improvement in the form of the teeth is assured by the cutter of the present invention.

The present cutter is utilized in the practice of the method disclosed in the above mentioned Letters Patent of R. H. Butters, No. 1,277,375, and which, for convenience, has been illustrated in Figures 7—11$^a$ and will be briefly described.

The cutter conforms to the type known in the mechanical trades as an "angular bevel cutter" and is shown as working in relation to three saw blades of a gang, these being designated X, Y and Z.

Figure 7 shows the cutter working simultaneously at the right side of the blank X and at the left side of the blank Y. Said cutter, commencing its operation at a point on the periphery of the blank, is rapidly rotated and simultaneously fed inwardly, preferably by the machinery disclosed in the pending application of R. H. Butters, Serial No. 161,002. In Figure 7ª the cutter is at the limit of its inward movement and the work on one side of the blank X is completed. Figure 8 shows the cuts made in the blanks X and Y when the cutter operates as shown in Figures 7 and 7ª. In both blanks X and Y the cutter has with its upper cutting edges 3, formed the base D of the next preceding tooth and has undercut said base at one side, viz: at the right side of the blank X and at the left side of the blank Y, as best shown in Figure 7ᵇ. In both cases the cutter has made a substantially V-shaped notch in the blank, as shown in Figure 7ª and of which the base D forms one wall. The other wall of the notch is generated by the lower cutting edges 3ª and is inclined laterally, its inclination being downward toward the right in the blank X and downward toward the left in the blank Y. A portion of the surface of the laterally inclined wall of each notch constitutes one of the inclined sides F of the upper face of the tooth.

Figure 9 shows the cutter as working simultaneously upon the blanks Y and Z, at the right side of the blank Y and the left side of the blank Z. The cutter forms a notch in the blank Z exactly similar to the notch previously formed in the blank Y as shown in Figure 8. In its operation on the blank Y in Figure 9 the cutter completes the tooth except for the formation of the base thereof, that is to say, in working on the right side of the blank Y the cutter completes the undercutting of the base of the next preceding tooth, as shown in Figure 9, and cuts away one side of the transversely inclined wall of the notch, whereby said wall has an inverted V-shaped cross-section and is accordingly formed with apex G and inclined sides F, as shown in Figures 10 and 9ª.

In Figure 11 the cutter is shown as working in the same relation as in Figure 7 upon the blanks X and Y but as forming the teeth next below the teeth formed by the operation depicted in Figure 7. The action of the cutter in the relation shown in Figure 10 is exactly the same as in Figure 7. That is to say, the cutter forms the base of the next preceding tooth and cuts a V-shaped notch of which said base forms one wall. It is to be observed, however, that the plane of the base includes the lower or outer terminal point of the apex G, as shown in the case of the blank Y in Figure 10, whereby the outer end of the base is triangular and the point of the tooth is of triangular pyramidal form. This is clearly illustrated in Figures 11 and 11ª showing a completed tooth T and below it a half-finished tooth T'. It will be observed that the base D of the tooth T is cut in a plane in which the lower or outer end of the apex G, as formed prior to the cutting of the tooth next below, lies.

It will be understood that all of the teeth are formed similarly to the tooth T shown in Figures 11 and 11ª. It is, of course, obvious that the teeth of the blank Y require for their completion operations of the cutter at the left side of said blank similar to the operations shown in connection with the blank Z and that the teeth of the blank Z require for their completion operations of the cutter at the right side of the blank similar to the operations shown in connection with the blank X. When the cutter working on one side of the blank has formed a notch therein, it is moved beyond the periphery of the blank and the blank is then shifted about its center as an axis of rotation through the distance of a tooth, whereby the cutter may repeat the operation in connection with the formation of the next lowermost tooth.

In all cases, the action of the cutter is positive, since the cutter works upon the stock of the teeth rather than upon the mere surfaces thereof. Hence, the action of the cutter is independent of the condition or alinement of the teeth transversely of the gang and such alinement will be perfectly and uniformly maintained.

The cutter of the present invention, which, as stated, conforms to the type well known in the mechanical trades as an "angular bevel cutter" is illustrated in Figures 1—5 and has a suitable number, e. g. eight, of cutting teeth 2 which radiate from a hub 1 and are separated by V-shaped notches 5. The front and rear faces 6 and 7 of each tooth are in substantially parallel planes and the front face 6 of one tooth and the rear face 7 of the tooth next in advance form the walls of each notch 5. Each tooth is provided in the plane of its front face with an upper cutting edge 3 and a lower cutting edge 3ª. While the plane in which the edges 3 and 3ª lie may be radial or substantially radial, it is, in the construction preferred and as shown, disposed at a suitable angle to a radial plane of the cutter touching said edges at any point thereof whereby (the cutter rotating in the direction of the arrow, Figure 5) a sensible shearing action on the saw teeth is produced in the operation of said edges which action is effective substantially to eliminate or prevent vibration or chattering. The edges 3 and 3ª of each tooth terminate at points 4 from which they diverge inward, the edges 3 occupying a horizontal plane and the edges 3ª being inclined downward. The outer edges 10 of the teeth and which subtend the front and rear faces 6 and 7 recede from the points 4 to points located inward of the imaginary circle wherein the points 4 lie, thereby providing a relief along the periphery of the cutter for the points 4. The upper faces 8 of the teeth are in planes inclined at a slight angle downward from the common plane wherein the edges 3 lie, thereby providing a relief for the edges 3. The under faces 9 of the teeth are bevelled throughout their extent and are inclined in a direction subtending the faces 6 and 7 in general conformity to the inclination of the edge 10, thereby providing a relief for the edges 3ª. It will thus be seen that the sectional area of each tooth in planes parallel to the front face 6 diminishes in a direction approaching the rear face 7 of the same tooth while the sectional outline of each tooth in said planes remains the same.

According to the present invention, the lower cutting edge 3ª of each tooth is a concave curvature generatrix, it having a concave curvature which is selected whereby said edge as it traverses the saw in the active zone of the cutter (see Figure 5) will generate in the central longitudinal plane of the saw a line (indicated diagrammatically at R in Figure 1) extending at a downward angle to the circumference of the saw and which at no point of its length will lie inward of a straight line drawn between the throat of the saw teeth and its point in that central plane of the saw wherein lies the generated line R. The line thus generated by the edge 3ª determines the longitudinal outline of the back of the tooth, i. e., the longitudinal outline of the apex G and sides F and, having the characteristic noted, may be either straight or somewhat convex, whereby the back of the tooth will be straight or convex and the pyramidal point of the tooth will be short and sturdy. In this way the strength and wearing and cutting qualities of the saw tooth are greatly improved in contrast with a saw tooth of the same length but produced by an angular cutter of the ordinary form and which has a straight lower cutting edge. It will be a matter of personal preference whether the generated line R be straight or somewhat convex. In both cases the same advantageous results will be secured and a concave cutting edge 3ª of a greater degree of concavity than that required for the generation of a straight line will generate a convex line.

According to the present invention the under faces 9 are curved throughout their extent in a direction parallel to the direction of the edges 3ª in such manner that a lower cutting edge parallel to the edge 3ª and located in any plane of the tooth lying inward of the plane in which the edges 3 and 3ª lie will generate a line R of the same outline as that generated by the said edge 3ª. In other words, each face 9 of each tooth provides a curved relief, any line of which parallel to the edge 3ª of the same tooth will serve as the location of a cutting edge which will generate a line R of the same outline as that generated by the said edge 3ª.

The cutter is sharpened by the action of a blade which operates between the periphery of the cutter and the hub just behind the face 6 and in a plane parallel to the plane of said face and removes an extremely thin strip of metal, thereby forming new cutting edges 3 and 3ª and a new face 6 parallel to the original cutting edges and face 6. Owing to the described curvature of the face 9 any new edge 3ª thus produced by sharpening will, as it traverses the saw in the active zone of the cutter, generate a line R of the same outline as that generated by the original edge 3ª.

Inasmuch as the tooth 2 diminishes in sectional area between the faces 6 and 7 the cutting edges produced by repeated resharpening of the cutter will become shorter but the sectional outline of the tooth in a plane parallel to the face 6 will remain the same. Hence, the tooth 2 may, by resharpening, be worn down so as to produce saw teeth whose dimensions are in constant ratio to the diameter of the saw as such diameter may be reduced from maximum to minimum by repeated resharpening and renewal of the said saw but whose outline and structural characteristics will remain the same.

By varying the maximum vertical thickness of the teeth of the cutter the number of teeth to the periphery of the saw may be varied.

By varying the angle of the working plane of the cutter the angle of the front or base of the saw tooth relatively to the radius of the saw may be varied without varying the proportions of the tooth.

By varying the angle of the curve of the lower cutting edge the angle of the back of the saw tooth relatively to the circumference may be varied without impairing its form, it being noted that the form of the saw tooth is independent of the cross-sectional form of the cutter teeth.

By varying the form or degree of the concave curve of the lower cutting edge the outline of the back of the tooth may be varied, subject to the limitation that the form or degree of said concave curve must generate a line R of the character and for the purposes and advantages described.

Having fully described our invention, we claim:—

1. As an element of a machine for sharpening linter saws an angular bevel cutter adapted by operation on the sides of a saw or saw blank to cut saw teeth therein and having a hub and a plurality of radiating teeth, each provided with upper and lower cutting edges in the plane of its front face, said edges extending divergingly from their peripherally located meeting point to said hub, the lower edge being a concavely curved generatrix operative to generate in a major plane of the saw a line which determines the location and outline of the back of the saw tooth and no point of which is located inward beyond a straight line drawn between the throat of the saw tooth and its point.

2. As an element of a machine for sharpening linter saws an angular bevel cutter adapted by operation on the sides of a saw or saw blank to cut saw teeth therein and having a hub and a plurality of radiating teeth, each provided with upper and lower cutting edges in the plane of its front face, said edges extending divergingly from their peripherally located meeting point to said hub, the lower edge being a concavely curved generatrix operative to generate in a major plane of the saw a line which determines the location and outline of the back of the saw tooth and no point of which is located inward beyond a straight line drawn between the throat of the saw tooth and its point, each cutter tooth having its outer edge inclined inward relatively to the circle wherein lie the meeting points of said cutting edges and having its under face inclined in conformity to said inclined outer edge, thereby to provide a relief for the lower cutting edge, and also concavely curved throughout its extent in a direction between said inclined outer edge and the hub in such manner that any line of said under face parallel to said lower cutting edge will determine the location of a cutting edge which will generate in the major plane of the saw a line of the same form and character as that generated by said lower cutting edge.

3. As an element of a machine for sharpening linter saws an angular bevel cutter adapted by operation on the sides of a saw or saw blank to cut saw teeth therein and having a hub and a plurality of radiating teeth, each provided with upper and lower cutting edges in the plane of its front face which plane is disposed at a suitable angle to a radial plane touching said edges at any point whereby to exercise a sensible shearing action on the saw or saw blank.

4. As an element of a machine for sharpening linter saws an angular bevel cutter adapted by operation on the sides of a saw or saw blank to cut saw teeth therein and having a hub and a plurality of radiating teeth, each provided with upper and lower cutting edges in the plane of its front face which plane is disposed at a suitable angle to a radial plane touching said edges at any point whereby to exercise a sensible shearing action on the saw or saw blank, said edges extending divergingly from their peripherally located meeting point to said hub, the lower edge being a concavely curved generatrix operative to generate in a major plane of the saw a line which determines the location and outline of the back of the saw tooth and no point of which is located inward beyond a straight line drawn between the throat of the saw tooth and its point.

In testimony whereof we have hereunto set our hands in presence of two subscribing witnesses.

WARNER H. CAMP.
ROBERT H. BUTTERS.

Witnesses:
P. C. McDuffie,
N. E. Rogers.